(12) United States Patent
Ren et al.

(10) Patent No.: US 10,430,635 B2
(45) Date of Patent: Oct. 1, 2019

(54) FINGERPRINT IDENTIFICATION SENSOR, FINGERPRINT IDENTIFICATION METHOD AND ELECTRONIC DEVICE

(71) Applicant: BOE TECHNOLOGY GROUP CO., LTD., Beijing (CN)

(72) Inventors: Qingrong Ren, Beijing (CN); Wei Yang, Beijing (CN); Jianming Sun, Beijing (CN); Yingwei Liu, Beijing (CN); Liangjian Li, Beijing (CN); Haisheng Wang, Beijing (CN); Yingming Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/767,704

(22) PCT Filed: Sep. 30, 2017

(86) PCT No.: PCT/CN2017/104712
§ 371 (c)(1),
(2) Date: Apr. 12, 2018

(87) PCT Pub. No.: WO2018/192188
PCT Pub. Date: Oct. 25, 2018

(65) Prior Publication Data
US 2019/0087624 A1     Mar. 21, 2019

(30) Foreign Application Priority Data
Apr. 18, 2017   (CN) .......................... 2017 1 0254361

(51) Int. Cl.
*G06K 9/00*     (2006.01)
(52) U.S. Cl.
CPC ....... *G06K 9/0004* (2013.01); *G06K 9/00087* (2013.01)

(58) Field of Classification Search
CPC .......................... G06K 9/0004; G06K 9/00087
See application file for complete search history.

(56) References Cited

U.S. PATENT DOCUMENTS

2009/0174835 A1* 7/2009 Lee ...................... G02F 1/1368
349/46
2014/0355846 A1 12/2014 Lee et al.
(Continued)

FOREIGN PATENT DOCUMENTS

| CN | 104573648 A | 4/2015 |
| CN | 105184247 A | 12/2015 |

(Continued)

OTHER PUBLICATIONS

Honsbuerg et al., Absorption Coefficient, pveducation.org, acquired from wayback machine with Sep. 12, 2016 date.*

(Continued)

*Primary Examiner* — John B Strege
(74) *Attorney, Agent, or Firm* — Calfee, Halter & Griswold LLP

(57) ABSTRACT

A fingerprint identification sensor, a fingerprint identification method and an electronic device are disclosed. The fingerprint identification sensor includes a substrate; a fingerprint sensing element disposed on the substrate and including a thin film transistor, an off-state leakage current of the thin film transistor varying with the intensity of light irradiating onto an active area thereof; and a fingerprint identification light source arranged to emit light that irradiates onto a finger and is reflected thereby, the reflected light irradiating onto the active area of the thin film transistor. Thus, the fingerprint identification can be realized conveniently, and the fingerprint identification sensor has at least one of the advantages like high sensitivity and simple structure.

18 Claims, 4 Drawing Sheets

(56) References Cited

U.S. PATENT DOCUMENTS

| | | | |
|---|---|---|---|
| 2016/0232397 A1 | 8/2016 | Yu et al. | |
| 2016/0239150 A1* | 8/2016 | Lee | G06K 9/00013 |
| 2017/0077200 A1* | 3/2017 | Mou | H01L 51/5076 |
| 2017/0255810 A1 | 9/2017 | Liu et al. | |
| 2017/0289805 A1* | 10/2017 | Hong | G09G 3/3233 |
| 2017/0337418 A1 | 11/2017 | Wang et al. | |
| 2018/0129831 A1* | 5/2018 | Yokoi | G06F 21/32 |
| 2018/0165498 A1* | 6/2018 | Xie | G06K 9/0004 |
| 2018/0239943 A1 | 8/2018 | Xu et al. | |
| 2019/0156097 A1 | 5/2019 | Liu et al. | |

FOREIGN PATENT DOCUMENTS

| | | |
|---|---|---|
| CN | 105373772 A | 3/2016 |
| CN | 105683993 A | 6/2016 |
| CN | 106233305 A | 12/2016 |
| CN | 106298859 A | 1/2017 |
| CN | 106326845 A | 1/2017 |
| CN | 107122723 A | 9/2017 |

OTHER PUBLICATIONS

Search Report for International Application No. PCT/CN2017/104712 dated Jan. 23, 2018.
First Office Action for Chinese Patent Application No. 201710254361.2 dated May 10, 2019.

* cited by examiner

FINGERPRINT IDENTIFICATION SENSOR, FINGERPRINT IDENTIFICATION METHOD AND ELECTRONIC DEVICE

RELATED APPLICATIONS

The present application is the U.S. national phase entry of PCT/CN2017/104712 with an International filing date of Sep. 30, 2017, which claims the benefit of Chinese Patent Application No. 201710254361.2, filed on Apr. 18, 2017, the entire disclosure of which is incorporated herein by reference.

TECHNICAL FIELD

The present disclosure relates to the electronic field, and more particularly to a fingerprint identification sensor, a fingerprint identification method and an electronic device.

BACKGROUND ART

With the development of communications technology and popularity of internet-based social intercourse, people currently can make on-line transactions, information transmission and various social activities by means of all kinds of intelligent electronic devices. As online functions are becoming richer, users set higher and higher requirements for the security of electronic devices. There occurs an electronic device with a fingerprint identification sensor, which achieves such functions as unlocking application and waking up screen.

However, the current fingerprint identification sensing technology is still in need of improvement.

SUMMARY

Inventors of this invention realize that fingerprint identification sensing in conventional electronic devices mostly has defects like structural complexity, poor sensitivity, and impossibility of integration with other structures in an electronic device. Through in-depth research and a large number of experiments, the inventors found that those defects mainly result from the fact that current fingerprint identification sensing identifies fingerprints mainly by detection of reflected laser or based on capacitance between a finger and a sensor. The above sensing manners require an extra laser detection component or intricate sensing electrodes, and the sensing sensitivity thereof is limited and the sensing time thereof can hardly be shortened.

In view of this, the inventors of the invention realize that the fingerprint identification sensor can use a light source, such as an OLED light source, and a thin film transistor as a fingerprint sensing element. Light emitted from the light source irradiates onto a finger to generate a reflected light, and the lights reflected by different parts of the finger may have different light intensities, which may affect an off-state leakage current of the thin film transistor. In this manner, fingerprint identification can be realized. The fingerprint identification sensor is structurally simple, highly sensitive and easy to be integrated with a structure, such as an array substrate, in an electronic device, in such a way to improve the fingerprint identification quality without an obvious increase in the volume of the electronic device.

According to an aspect of the present invention, there is provided a fingerprint identification sensor. The fingerprint identification sensor can comprise a substrate; a fingerprint sensing element that can be disposed on the substrate and include a thin film transistor, an off-state leakage current of the thin film transistor varying with the intensity of light irradiating onto an active area thereof; and a fingerprint identification light source that can be arranged to emit light that can irradiate onto a finger and be reflected thereby, the reflected light irradiating onto the active area of the thin film transistor. Thus, the fingerprint identification can be realized conveniently, and the fingerprint identification sensor has at least one of the advantages like high sensitivity and simple structure.

In an embodiment, the fingerprint identification sensor can further comprise a plurality of the fingerprint sensing elements evenly distributed on the substrate. Thus, multilocus sensing can be realized to thereby increase the accuracy of fingerprint identification.

In an embodiment, the material of the active area of the thin film transistor has a band-gap width of less than 2 eV, which may be conducive to improving the sensitivity of leakage current to a reflected light.

In an embodiment, the material of the active area absorbs light emitted from the fingerprint identification light source with an absorption coefficient of more than $10^5$, which is conducive to improving the sensitivity of leakage current to a reflected light.

In an embodiment, the active area of the thin film transistor comprises at least one of amorphous silicon, ITZO and ITEO, which is conducive to improving the sensitivity of leakage current to a reflected light.

In an embodiment, the fingerprint identification light source can comprise an OLED light source.

In an embodiment, the OLED light source is insulated from the thin film transistor. Thus, it can prevent mutual influence between the thin film transistor and the OLED light source, which may otherwise negatively affect the fingerprint identification.

In an embodiment, an anode of the OLED is arranged on an insulating layer of the thin film transistor, which can prevent mutual influence between the OLED and the thin film transistor.

In an embodiment, the fingerprint identification sensor further comprises: an OLED driving circuit connected to the anode of the OLED so as to drive the OLED to irradiate.

In an embodiment, the fingerprint identification sensor further comprises: a differential amplifier circuit connected to a drain of the thin film transistor so as to amplify a leakage current signal of the drain. Thus, the fingerprint identification effect of the fingerprint identification sensor can be further improved.

In an embodiment, at off-state voltage of the thin film transistor, the difference between the leakage currents corresponding to the reflected lights generated by a valley and a ridge of the finger is no less than three orders of magnitude. Thus, the sensitivity of the fingerprint identification sensor can be further improved.

According to another aspect of the present invention, there is provided an electronic device. The electronic device comprises any fingerprint identification sensor as mentioned above, which can improve the fingerprint identification performance of the electronic device.

According to another aspect of the present invention, there is provided a fingerprint identification method using any fingerprint identification sensor as mentioned above. In an embodiment, the method can comprise the steps of: lighting a fingerprint identification light source so that light emitted from the fingerprint identification light source irradiates onto a finger and is reflected thereby; and utilizing a fingerprint sensing element to generate a sensing signal based on the light reflected by the finger in order to realize fingerprint identification. Thus, fingerprint identification can be realized conveniently.

In an embodiment, the sensing signal is a leakage current of the fingerprint sensing element, which is conducive to improving the fingerprint identification sensitivity.

In an embodiment, the lights reflected by different parts of the finger have different light intensities, and the leakage current varies with the light intensity of the reflected light, which is conducive to improving the fingerprint identification sensitivity.

In an embodiment, the difference between the leakage currents generated by the reflected lights at a valley and a ridge of the finger is no less than three orders of magnitude, which is conducive to improving the fingerprint identification sensitivity.

In an embodiment, the method further comprises the step of: amplifying the leakage current by means of a differential amplifier circuit, which can further improve the fingerprint identification sensitivity of the method.

In an embodiment, the step of lighting the fingerprint identification light source further comprises the step of lighting the fingerprint identification light source by means of an OLED driving circuit connected to an anode of an OLED. Thus, the fingerprint identification effect can be further improved using the method.

BRIEF DESCRIPTION OF DRAWINGS

The above and/or additional aspects and advantages of the present invention will become obvious and be readily understood in the description of embodiments with reference to the following drawings.

REFERENCE SIGNS

Figure 1:
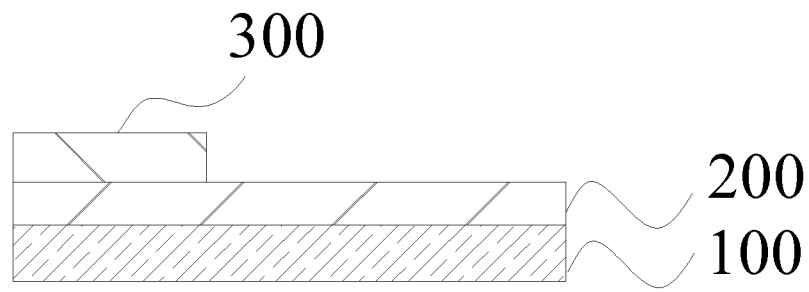
FIG. 1 shows a structural schematic view of a fingerprint identification sensor according to an embodiment of the present invention.

100: Substrate; 200: Fingerprint Sensing Element; 210: Gate; 220: Gate Insulating Layer; 230: Drain; 240: Source; 250: Active Area; 260: Insulating Layer; 300: Fingerprint Identification Light Source; 310: Anode; 320: Cathode; 400: Differential Amplifier Circuit; 500: OLED Driving Circuit; and 600: Backlight Module.

DETAILED DESCRIPTION

To understand the objects, technical solutions and advantages of some embodiments more clearly, the embodiments will be described in detail with reference to the drawings. Examples of the embodiments are shown in the drawings, wherein like or similar reference signs always indicate like or similar elements or elements having like or similar functions. Embodiments described with reference to the drawings are exemplary and only for explaining the present invention, and shall not be understood as limitations to the present invention.

In the description of the present disclosure, the orientations or positional relationships indicated by terms, such as "top" and "bottom", are those shown in the drawings, and used to facilitate description of some embodiments of the present invention, rather than require that the present invention must be configured and operated in a certain orientation. Thus, they shall not be understood as limitations to the present invention.

FIG. 1 shows a structural schematic view of a fingerprint identification sensor according to an embodiment of the present invention. With reference to FIG. 1, the fingerprint identification sensor can comprise: a substrate 100, a fingerprint sensing element 200 and a fingerprint identification light source 300, wherein the fingerprint sensing element 200 can be disposed on the substrate 100 and include a thin film transistor, and an off-state leakage current of the thin film transistor varies with the intensity of light irradiating onto an active area thereof. The fingerprint identification light source 300 can irradiate and be arranged to emit light that can irradiate onto a finger and be reflected thereby, and the reflected light can irradiate onto the active area of the thin film transistor. Thus, the fingerprint identification can be realized conveniently, and the fingerprint identification sensor has at least one of the advantages like high sensitivity and simple structure.

For easy understanding, the principle of fingerprint identification by a fingerprint identification sensor according to some embodiments of the present invention will be briefly introduced first:

Firstly, light emitted from the fingerprint identification light source 300 irradiates onto a finger, the fingerprint of which is to be identified. The finger reflects the light emitted from the fingerprint identification light source 300, and different parts (ridges and valleys of the fingerprint) of the finger due to the slight difference in heights generate the reflected lights with different light intensities. The reflected light irradiates onto the active area of the fingerprint sensing element 200. When the fingerprint sensing element 200 (the thin film transistor) is in an off state, the intensity of the reflected light can affect the leakage current generated by the fingerprint sensing element 200. By detecting the leakage current, one can obtain the heights of different parts of the finger, and further the fingerprint information of the finger. The fingerprint sensing and identification can be realized by comparing the fingerprint information obtained by the fingerprint identification sensor with the pre-stored fingerprint information.

According to some embodiments of the present invention, the structures and components of the fingerprint identification sensor will be described.

Figure 3:
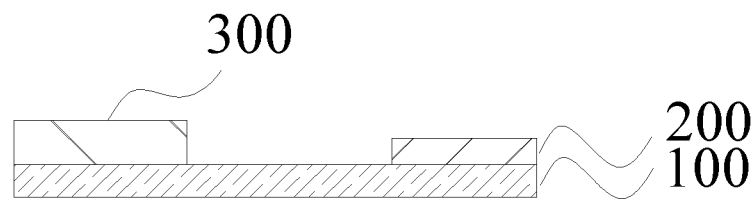
FIG. 3 shows a structural schematic view of a fingerprint identification sensor according to an embodiment of the present invention.

In different embodiments, no special limitations are imposed on the particular type and position of the fingerprint identification light source 300. For instance, in an embodiment, the fingerprint identification light source 300 can comprise an OLED. In an implementation, a monochromic OLED can be used to form the fingerprint identification light source 300, which is beneficial for reduction of production cost. For example, a blue or red OLED can be used to constitute the fingerprint identification light source 300. In some embodiments, it is also possible to utilize an electronic device equipped with the fingerprint identification sensor, such as a backlight illuminating structure in such an apparatus as a mobile phone or a display device, to constitute the fingerprint identification light source 300. It shall be explained that the position of the fingerprint identification light source 300 is not specially limited as long as it can meet the requirements that the light emitted therefrom can irradiate onto the finger to be identified, and the light reflected by the finger can irradiate onto the active area of the fingerprint sensing element 200. For example, the fingerprint identification light source 300 can be disposed on the surface of the side of the fingerprint sensing element 200 that is away from the substrate 100. Thus, the fingerprint identification light source 300 can get closer to the finger, which helps to improve the overall intensity of the reflected light and thereby enhance the effect of fingerprint identification. Or, according to some other embodiments of the present invention, with reference to FIG. 3, the fingerprint identification light source 300 can also be arranged in the same layer as the fingerprint sensing element 200, which can save the space occupied by the fingerprint identification sensor, and further make an apparatus having the fingerprint identification sensor lighter and thinner.

Figure 2:
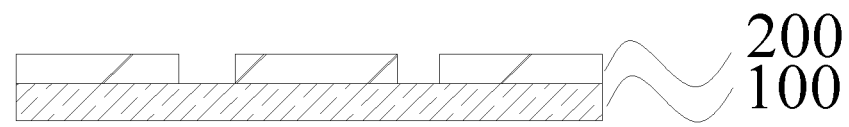
FIG. 2 shows a partial structural schematic view of a fingerprint identification sensor according to another embodiment of the present invention.

FIG. 2 shows a partial structural schematic view of a fingerprint identification sensor according to another embodiment of the present invention. With reference to FIG. 2, the fingerprint identification sensor can further comprise: a plurality of fingerprint sensing elements 200. The plurality of fingerprint sensing elements 200 can be evenly distributed on the substrate 100. For example, the plurality of fingerprint sensing elements 200 can be arranged in arrays on the substrate 100. In an implementation, the plurality of fingerprint sensing elements 200 can be arranged into a plurality of rows parallel to each other and a plurality of columns parallel to each other. Any two adjacent fingerprint sensing elements 200 can be kept at an equal distance. Thus, multilocus sensing can be realized to thereby increase the accuracy of fingerprint identification.

Figure 4:
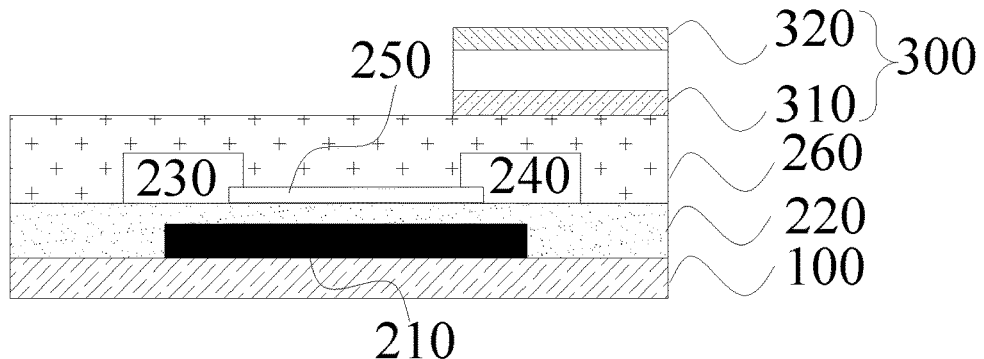
FIG. 4 shows a structural schematic view of a fingerprint identification sensor according to another embodiment of the present invention.

Those ordinarily skilled in the art can understand that the specific type of the thin film transistor of the fingerprint sensing element 200 is not subject to any special limitation, as long as the leakage current can vary with the changing intensity of the reflected light at an off-state voltage. FIG. 4 shows a structural schematic view of a fingerprint identification sensor according to another embodiment of the present invention. With reference to FIG. 4, the thin film transistor (the fingerprint sensing element 200) can comprise a gate 210, a gate insulating layer 220, a drain 230, a source 240, an active area 250 and an insulating layer 260. The inventors found through lots of experiments that the sensitivity of the fingerprint identification sensor to fingerprint identification can be improved by adjusting the material of the active area 250. To be specific, the material of the active area 250 can be selected so as to make significant the difference between the current values of the leakage currents generated by the lights (different light intensities) reflected by the ridge and valley of the finger. In doing so, the fine lines of the fingerprint are distinguishable more precisely. In an embodiment, the material of the active area 250 can have a band-gap width of less than 2 eV. A material with a smaller band-gap width may be conducive to increasing the sensitivity of the thin film transistor to a reflected light. In an embodiment, the material of the active area 250 absorbs light emitted from the fingerprint identification light source with an absorption coefficient of more than $10^5$, which is conducive to increasing the sensitivity of the fingerprint identification sensor. In another embodiment, the active area 250 can comprise at least one of amorphous silicon, ITZO and ITEO. The inventors found through lots of experiments that the active area 250 formed of the above material is very sensitive to the intensity of the reflected light. When the light intensity of the reflected light varies, the active area 250 formed of the above material can sensitively affect the off-state leakage current of the thin film transistor according to the variation of the light intensity. For example, at off-state voltage of the thin film transistor having the active area 250 formed of the above material, the difference between the leakage currents corresponding to the reflected lights generated by a valley and a ridge of the finger is no less than three orders of magnitude. That is to say, the leakage current corresponding to the position of the valley of the finger is greatly different from the leakage current corresponding to the position of the ridge of the finger so that the valley is distinguishable from the ridge. Thus, the fingerprint can be accurately identified by the fingerprint identification sensor according to these embodiments.

In an embodiment, in order to further improve the fingerprint identification effect of the fingerprint identification sensor, when the fingerprint identification sensor is used for sensing, the gate 210 can be applied with an off-state voltage so as to reduce the background current value of the leakage current. Thus, the sensitivity of the fingerprint identification sensor to the reflected light generated by the finger can be further improved.

As stated above, the fingerprint identification sensor identifies a fingerprint using the leakage current of the thin film transistor. Thus, in an embodiment, the fingerprint identification light source 300 (OLED) can be insulated from the thin film transistor. Thus, it can prevent mutual influence between the thin film transistor and the OLED, which may otherwise negatively affect the fingerprint identification.

In an implementation, an anode 310 of the OLED is arranged on the insulating layer 260 of the thin film transistor. Thus, the insulation between the fingerprint identification light source 300 (OLED) and the thin film transistor can be conveniently realized, which can prevent mutual influence between the OLED and the thin film transistor.

Figure 5:
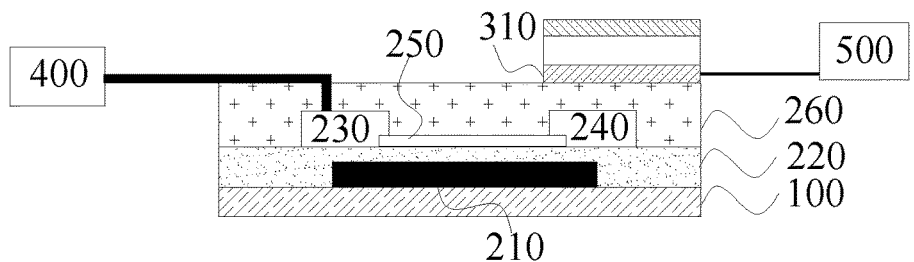
FIG. 5 shows a structural schematic view of a fingerprint identification sensor according to a yet embodiment of the present invention.

FIG. 5 shows a structural schematic view of a fingerprint identification sensor according to a yet embodiment of the present invention. With reference to FIG. 5, the fingerprint identification sensor can further comprise a differential amplifier circuit 400 and an OLED driving circuit 500. In an implementation, the OLED driving circuit 500 can be connected to the anode 310 of the OLED so as to drive the OLED to irradiate. Thus, the OLED can be separately driven to irradiate independent of the thin film transistor, so as to avoid influence to the leakage current of the thin film transistor, which may affect the fingerprint identification effect. In an embodiment, the differential amplifier circuit 400 can be connected to the drain 230 of the thin film transistor so as to amplify a leakage current signal of the drain. Thus, the fingerprint identification effect of the fingerprint identification sensor can be further improved.

Those ordinarily skilled in the art can understand that the specific type of the differential amplifier circuit 400 and the OLED driving circuit 500 is not subject to special limitation as long as a signal can be amplified or an OLED can be driven. Those skilled in the art can design according to actual conditions. For instance, the specific parameters of the differential amplifier circuit 400 and the OLED driving circuit 500 can be designed to according to the IC type of the electronic device provided with the fingerprint identification sensor.

Figure 6:
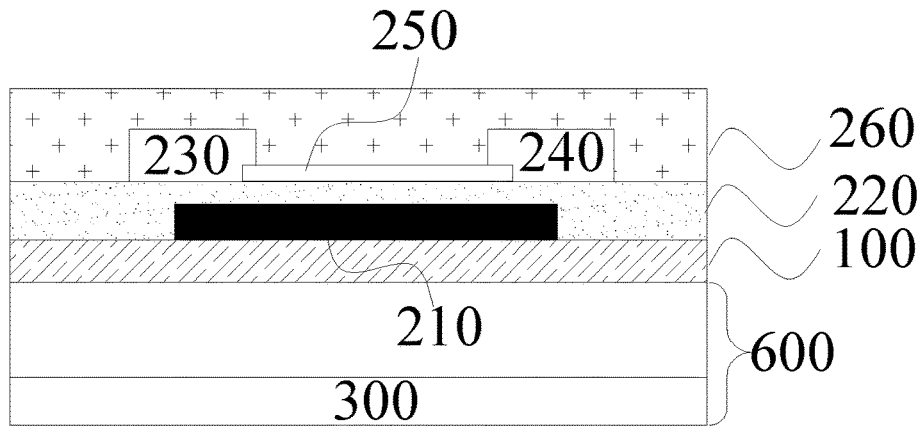
FIG. 6 shows a structural schematic view of a fingerprint identification sensor according to a yet embodiment of the present invention.

FIG. 6 shows a structural schematic view of a fingerprint identification sensor according to a yet embodiment of the present invention. With reference to FIG. 6, an inherent light source in the electronic device equipped with the fingerprint identification sensor can be utilized to constitute the fingerprint identification light source 300 of the fingerprint identification sensor. For example, when the fingerprint identification sensor is disposed on the display device, a backlight source of a backlight module 600 in the display device can serve as the fingerprint identification light source 300. Then, the substrate 100 and the fingerprint sensing element 200 can be disposed above the backlight source 600, and the light emitted from the backlight source transmits upwardly and then irradiates onto a finger to be identified, and the reflected light generated by the finger irradiates onto the active area of the fingerprint sensing element 200 for the sake of fingerprint identification.

The above-mentioned fingerprint identification sensor can realize the fingerprint identification by a simple structure. Moreover, those skilled in the art can understand that since the fingerprint identification sensor utilizes a thin film transistor as the fingerprint sensing element 200, the fingerprint identification sensor can be integrated with such a structure as an array substrate in an LCD display. Since the array substrate also has a structure of thin film transistor, the arrangement of the fingerprint identification sensor on the array substrate can realize the convenient arrangement of the fingerprint identification sensor without significantly increasing the thickness of the array substrate. For example, the fingerprint identification sensor can be disposed in a non-display area of the array substrate, so as to realize fingerprint identification and sensing in the non-display area. Or, in an embodiment, the fingerprint identification sensor can be disposed in a display area of the array substrate, and it only needs to additionally arrange the fingerprint sensing element 200 and the fingerprint identification light source 300 while the array substrate is manufactured. Those skilled in the art can understand, in actual application, the specific position of the fingerprint identification sensor is not subject to special limitation as long as the fingerprint identification sensor can be disposed in a position of the electronic device that is accessible by a finger. For instance, the fingerprint identification sensor can also be arranged on a backboard of an electronic device such as a mobile phone.

In summary, the fingerprint identification sensor according to some embodiments of the present invention has at least one of the following advantages:

(1) it has a simple structure and needs no complicated circuit design, which helps to save costs;

(2) a fingerprint is identified according to the leakage current of the thin film resistor, which assures a quick response and high sensitivity;

(3) it can be readily integrated with an inherent structure of an electronic device, which saves the space occupied by the fingerprint identification sensor and renders the electronic device thinner and lighter.

Figure 7:
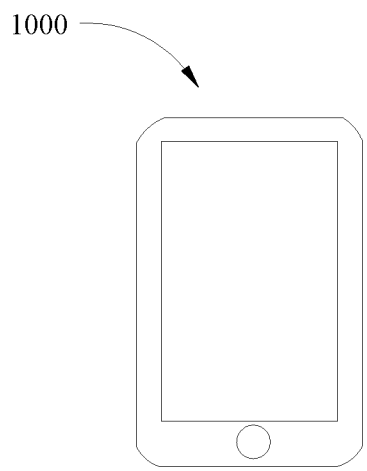
FIG. 7 shows a structural schematic view of an electronic device according to an embodiment of the present invention.

FIG. 7 shows a structural schematic view of an electronic device according to an embodiment of the present invention. With reference to FIG. 7, the electronic device 1000 comprises a fingerprint identification sensor as stated above. Thus, the electronic device 1000 has all the features and advantages of the fingerprint identification sensor as stated above, which will not be reiterated herein. In general, the electronic device can conveniently identify a user's fingerprint, and is sensitive in fingerprint identification with high accuracy, and a fingerprint identification sensor can be conveniently disposed in the electronic device, which helps to render the electronic device lighter and thinner.

Figure 9:
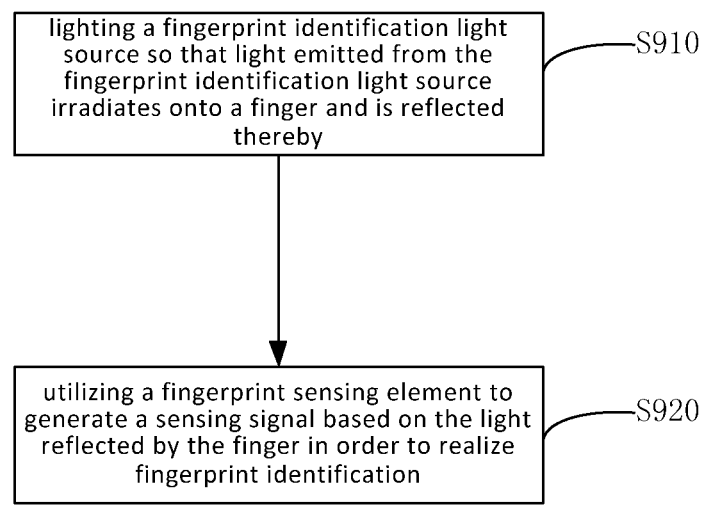
FIG. 9 shows a flow chart of a fingerprint identification method according to an embodiment of the present invention.

FIG. 9 shows a flow chart of a fingerprint identification method according to an embodiment of the present invention. The method carries out the fingerprint identification using the fingerprint identification sensor as stated above. As shown in FIG. 9, the method can comprise two steps S910 and S920.

(1) Lighting a Fingerprint Identification Light Source

In the step S910, the fingerprint identification light source is lighted so that the light emitted from the fingerprint identification light source can irradiate onto a finger and be reflected thereby. The specific type, position and lighting manner of the fingerprint identification light source have been described in the previous text in detail, which will not be reiterated herein. For instance, during fingerprint identification by the fingerprint identification sensor, a finger gets closer to the fingerprint identification sensor. At this time, an OLED driving circuit can be used to light the OLED. Thus, the light emitted from the OLED irradiates onto a finger and is reflected thereby. As stated above, the light intensity of the reflected light varies with different positions (valley and ridge) of the fingerprint of the finger.

(2) Generating a Sensing Signal

In the step S920, a fingerprint sensing element generates a sensing signal based on the reflected light generated by the finger so as to realize fingerprint identification. Thus, fingerprint identification can be realized conveniently.

In an embodiment, the sensing signal can be a leakage current of the fingerprint sensing element. In an implementation, the difference between the leakage currents generated by the lights reflected by a valley and a ridge of the finger can be no less than three orders of magnitude. Thus, the sensitivity to fingerprint identification can be further improved. The specific type of the fingerprint sensing element and the principle of a reflected light affecting a leakage current have been described in the previous text in detail, which will not be reiterated herein.

In an embodiment, in order to further improve the fingerprint identification sensitivity by this method, the step can further comprise the step of amplifying the leakage current by means of a differential amplifier circuit, which can further improve the fingerprint identification sensitivity by the method.

In an embodiment, the method can further comprise the step of collecting the generated sensing signals (leakage currents) so as to obtain a diagram showing the leakage current signals corresponding to different parts of a finger. By means of such a structure as an IC, the diagram showing the leakage current signals can be analyzed and compared with a pre-stored fingerprint image. If the compared result complies with the pre-stored fingerprint image, the fingerprint identification succeeds, and the IC sends out an instruction such as waking up a screen or entering into a corresponding application. If the compared result does not comply with the pre-stored fingerprint image, the fingerprint identification fails.

A solution of the present invention will be explained in conjunction with an embodiment. Those skilled in the art will understand that the following embodiment is merely used to explain the present invention, and should not be regarded as a limitation to the scope of the present invention. An embodiment with no record of specific technologies or conditions is carried out according to the technologies or conditions described in the references in the present field or according to the description of a product. An agent or instrument without an indicator of the manufacturer can be a commercially available conventional product.

The thin film transistor is used as a fingerprint sensing element. The insulating layer is SiN, the active layer is a-Si:H, and the source, drain and gate are formed of Cu. A blue OLED is used as a fingerprint identification light source, and the OLED is arranged on a flattened layer (insulating layer) of the thin film transistor.

Figure 8:
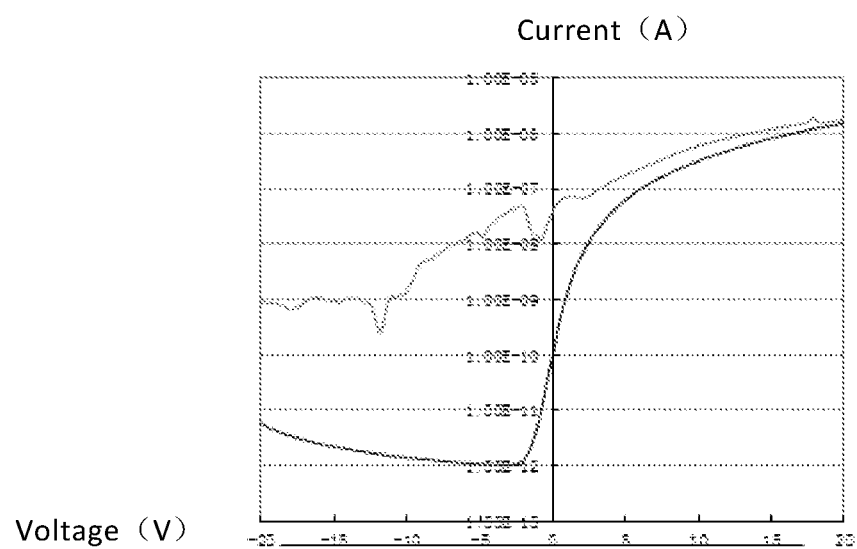
FIG. 8 is a diagram showing the test results of the fingerprint identification sensor according to an embodiment of the present invention.

Under the condition that the gate is applied with an off-state voltage, the leakage current of the fingerprint identification sensor at a ridge and valley of a finger is detected. The detection result is shown in FIG. 8. With reference to FIG. 8, under the condition that the gate is applied with a voltage of about −2V (as shown in the horizontal coordinate), the leakage currents at the ridge and valley of a finger (two curves shown in FIG. 8) can have a difference of three orders of magnitude. Thus, the positions of the ridge and valley of a finger can be distinguished.

In the description of the present invention, the reference terms "an embodiment" or "another embodiment" means that a specific feature, structure, material or characteristic described according to the embodiment is included in at least one embodiment of the present invention. In the present description, exemplary expressions of those terms are not directed to the same embodiment or example. Moreover, the specific feature, structure, material or characteristic described can be combined in any or more embodiments or examples in a suitable manner. In addition, on the premise of no contradiction, those skilled in the art can merge or combine different embodiments or examples, as well as the features thereof, described herein.

Although some embodiments of the present invention have been shown and described, it can be understood that the above embodiments are only exemplary, and shall not be understood as limitations to the present invention. It shall be pointed out that those ordinarily skilled in the art can make variations, modifications, replacements and alternations to those embodiments without departing from the spirit and principle of the present invention. These variations, modifications, replacements and alternations will fall within the protection scope of the present invention. The protection scope of the present invention shall be based on the protection scope of the appended claims.

In the claims, any reference sign in parentheses should not be interpreted as a limitation to the claims. The terms "comprise/include" do not exclude the presence of elements or steps other than those listed in the claims. The word "a" or "an" in front of elements does not exclude the presence of a plurality of such elements. The mere fact that some measures are recited in mutually different dependent claims does not mean that the combination of those measures cannot be used to advantage.

What is claimed is:

1. A fingerprint identification sensor, comprising:
   a substrate;
   a fingerprint sensing element disposed on the substrate and including a thin film transistor, an off-state leakage current of the thin film transistor at an off-state voltage applied to a gate of the thin film transistor varying with the intensity of light irradiating onto an active area thereof, the fingerprint sensing element being configured to generate a sensing signal based on the off-state leakage current; and
   a fingerprint identification light source arranged to emit light that irradiates onto a finger and is reflected thereby, the reflected light irradiating onto the active area of the thin film transistor.

2. The fingerprint identification sensor according to claim 1, further comprising a plurality of the fingerprint sensing elements evenly distributed on the substrate.

3. The fingerprint identification sensor according to claim 1, wherein the material of the active area of the thin film transistor has a band-gap width of less than 2 eV.

4. The fingerprint identification sensor according to claim 3, wherein the material of the active area absorbs light emitted from the fingerprint identification light source with an absorption coefficient of more than $10^5$ cm$^{-1}$.

5. The fingerprint identification sensor according to claim 3, wherein the active area of the thin film transistor comprises at least one of amorphous silicon, ITZO and ITEO.

6. The fingerprint identification sensor according to claim 1, wherein the fingerprint identification light source comprises an OLED light source.

7. The fingerprint identification sensor according to claim 6, wherein the OLED light source is insulated from the thin film transistor.

8. The fingerprint identification sensor according to claim 7, wherein an anode of the OLED is arranged on an insulating layer of the thin film transistor.

9. The fingerprint identification sensor according to claim 6, further comprising an OLED driving circuit connected to the anode of the OLED so as to drive the OLED to irradiate.

10. The fingerprint identification sensor according to claim 1, further comprising a differential amplifier circuit connected to a drain of the thin film transistor so as to amplify a leakage current signal of the drain.

11. The fingerprint identification sensor according to claim 1, wherein, at off-state voltage of the thin film transistor, the leakage currents corresponding to the reflected lights generated by a valley and a ridge of the finger differ by no less than three orders of magnitude.

12. An electronic device, comprising the fingerprint identification sensor according to claim 1.

13. A fingerprint identification method using a fingerprint identification sensor,
   wherein the fingerprint identification sensor comprises a substrate; a fingerprint sensing element disposed on the substrate and including a thin film transistor, an off-state leakage current of the thin film transistor at an off-state voltage applied to a gate of the thin film transistor varying with the intensity of light irradiating onto an active area thereof; and a fingerprint identification light source arranged to emit light that irradiates onto a finger and is reflected thereby, the reflected light irradiating onto the active area of the thin film transistor,
   the method comprising the steps of:
   lighting the fingerprint identification light source so that light emitted from the fingerprint identification light source irradiates onto the finger and is reflected thereby; and
   applying the off-state voltage to the gate of the thin film transistor, detecting the off-state leakage current of the thin film transistor, and generating a sensing signal based on the detected off-state leakage current in order to realize fingerprint identification.

14. The method according to claim 13, wherein the lights reflected by different parts of the finger have different light intensities, and the leakage current varies with the light intensity of the reflected light.

15. The method according to claim 13, wherein the leakage currents generated by the reflected lights at a valley and a ridge of the finger differ by no less than three orders of magnitude.

16. The method according to claim 13, further comprising the step of: amplifying the leakage current by means of a differential amplifier circuit.

17. The method according to claim 13, wherein the step of lighting the fingerprint identification light source further comprises the step of lighting the fingerprint identification light source by means of an OLED driving circuit connected to an anode of an OLED.

18. The fingerprint identification sensor according to claim 4, wherein the active area of the thin film transistor comprises at least one of amorphous silicon, ITZO and ITEO.

\* \* \* \* \*